(12) United States Patent
Kadengal

(10) Patent No.: US 6,804,196 B1
(45) Date of Patent: Oct. 12, 2004

(54) DETERMINING TRAFFIC INFORMATION IN A COMMUNICATIONS NETWORK

(75) Inventor: Radhakrishanan Kadengal, Harlow (GB)

(73) Assignee: Nortel Networks Limited, St. Laurent (CA)

(*) Notice: Subject to any disclaimer, the term of this patent is extended or adjusted under 35 U.S.C. 154(b) by 742 days.

(21) Appl. No.: 09/716,594

(22) Filed: Nov. 20, 2000

(51) Int. Cl.[7] .............................................. H04L 12/56
(52) U.S. Cl. ...................................... 370/230; 370/401
(58) Field of Search .............................. 370/230, 230.1, 370/231, 352, 353, 389, 395.2, 395.21, 395.31, 395.4, 401, 410, 462, 468

(56) References Cited

U.S. PATENT DOCUMENTS

| | | | | |
|---|---|---|---|---|
| 5,996,021 A | * | 11/1999 | Civanlar et al. | 709/238 |
| 6,487,170 B1 | * | 11/2002 | Chen et al. | 370/231 |
| 6,621,793 B2 | * | 9/2003 | Widegren et al. | 370/230.1 |
| 6,631,128 B1 | * | 10/2003 | Lemieux | 370/351 |
| 6,654,607 B1 | * | 11/2003 | Shobatake et al. | 455/433 |
| 6,671,256 B1 | * | 12/2003 | Xiong et al. | 370/230 |
| 6,678,474 B1 | * | 1/2004 | Masuda et al. | 398/75 |
| 6,701,149 B1 | * | 3/2004 | Sen et al. | 455/436 |

* cited by examiner

Primary Examiner—Min Jung
(74) Attorney, Agent, or Firm—Barnes & Thornburg LLP

(57) ABSTRACT

A communications packet network comprises an optical core network of core routers interconnected by links and a plurality of edge routers providing access to the core network. The network is partitioned into a plurality of regions, each region being provided with a respective network information database. Within each region, link occupancy data is determined via the core routers and stored in the respective network information database. An edge router wishing to despatch packets into the core network acquires the link occupancy data from the network information databases in those network regions through which packets are to be routed so as to schedule despatch of those packets into the core network at a rate commensurate with resource availability within the core network. Preferably, the link occupancy data is classified into quality of service classes.

25 Claims, 12 Drawing Sheets

Flows c1, c2, and c3 works with the resource price information available at network access points. This eliminates the need to poll individual routers within an autonomous network. System characteristics remain same across multiple domains.

DETERMINING TRAFFIC INFORMATION IN A COMMUNICATIONS NETWORK

FIELD OF THE INVENTION

This invention relates to methods and apparatus for determining traffic information in a communications network e.g. to facilitate route planning and resource allocation.

BACKGROUND OF THE INVENTION

Communications packet networks are currently being developed for the transport of multimedia services including voice and data traffic. The services carried by such networks vary considerably in their transport requirements. For example, best effort data services can tolerate delay or loss of packets, whereas voice services require guaranteed quality real time virtual conventions.

These differing traffic requirements can pose significant problems for a network management system which is used to control resource allocation and to determine routing so as to guarantee service to high Q0S traffic that is admitted to the network. This is a particular problem in a MPLS network.

A further problem has become apparent with the introduction of packet networks having an optical core. Within the core of such a network, buffering or queuing of packets arriving at a router poses a severe problem. There is thus an increasing need to control packet flow at the network edge to ensure that, before packets are launched into the network core, sufficient resources are available to process these packets so as to avoid the need for buffering. This in turn requires a means of measuring bandwidth occupancy in the various parts of the network so that resources can be allocated appropriately.

Currently, a simple network management protocol (SNMP) is employed to provide measurements of link occupancy within the network. However, this protocol provides no information as to the quality of service level of the traffic, and further generates a large volume of signalling traffic. This signalling traffic is of course non-revenue earning and thus reduces the potential revenue return to the network operator.

SUMMARY OF THE INVENTION

An object of the invention is to minimise or to overcome the above disadvantages.

A further object of the invention is to provide an improved arrangement and method for link occupancy measurement within a network.

Another object of the invention is to provide and improved arrangement and method for resource allocation within a network.

According to the invention there is provided a method of determining traffic information in a communications packet network comprising a plurality of regions, the method comprising, within each network region, maintaining a database of traffic information for that region, and polling the databases of selected other regions to which packets are to be routed so as to determine resource availability for those packets.

According to another aspect of the invention there is provided a method of controlling packet flow and allocating resources in a communications packet connection network partitioned into a plurality of regions and carrying a core network and a plurality of edge routers providing access to the core network, the method comprising; within each region, maintaining a database of traffic information from that region, and, at each edge router, determining from traffic information stored in the database of the region containing the edge router and from databases of other regions to which packets are to be routed, a measure or resource availability for a packet to be routed in order to allocate resources to route said packet.

According to a further aspect of the invention there is provided a method of scheduling despatch of information packets at an edge router in a communications packet network in a network comprising an optical core network of core routers interconnected by links and a plurality of edge routers providing access to the core network, said network being partitioned into a plurality of regions, each said region being provided with a respective network information database, the method comprising; determining within each region link occupancy data and storing that data in the respective network information database, and, at an edge router, acquiring said link occupancy data from the network information databases in those network regions through which packets are to be routed so as to schedule the despatch of that packet into the core network so as to schedule despatch of those packets at a rate commensurate with resource availability within the core network.

According to another aspect of the invention there is provided software stored on a storage medium in machine readable form for scheduling despatch of information packets at an edge router in a communications packet network in a network comprising an optical core network of core routers interconnected by links and a plurality of edge routers providing access to the core network, said network being partitioned into a plurality of regions, each said region being provided with a respective network information database, wherein the software is arranged to perform the method steps of; determining within each region link occupancy data and storing that data in the respective network information database, and, at an edge router, acquiring said link occupancy data from the network information databases in those network regions through which packets are to be routed so as to schedule the despatch of that packet into the core network so as to schedule despatch of those packets at a rate commensurate with resource availability within the core network According to another aspect of the invention there is provided a communications packet network comprising an optical core network of core routers interconnected by links and a plurality of edge routers providing access to the core network, said network being partitioned into a plurality of regions, each said region being provided with a respective network information database, wherein the network incorporates means for determining, within each region, link occupancy data and for storing that data in the respective network information database, and wherein each said edge router has means for acquiring said link occupancy data from the network information databases in those network regions through which packets are to be routed so as to schedule despatch of those packets into the core network at a rate commensurate with resource availability within the core network.

According to a further aspect of the invention, there is provided an edge router for providing access to a communications packet network comprising an optical core network of core routers interconnected by links, said network being partitioned into a plurality of regions, each said region being provided with a respective network information database containing link occupancy data, and wherein each said edge router has means for acquiring said link occupancy data from the network information databases in those network regions through which packets are to be routed so as to schedule despatch of those packets into the core network at a rate commensurate with resource availability within the core network In a preferred embodiment, the traffic information comprises link occupancy measurements on a per-traffic or quality of service class basis.

Advantageously, the system incorporates distributed software objects running on core router that log the traffic data and respond to request when polled from edge routers.

Depending on local network occupancy levels, the acquired data may be 'pulled' from selected network database on an as-needed basis, or particular databases may 'push' or broadcast their information into the network.

The Information retrieved by the edge router may advantageously be used to control routing and transport of traffic across the network traffic by a way a dynamic pricing arrangement. The data or link occupancy information that is gathered can be employed to calculate notional resource price or so-called n-price for network bandwidth based on the current occupancy of a preferred route is described in U.S. Pat. No. 6,671,285 (Kirby et. al.) issued Dec. 30, 2003, the contents of which are incorporated herein by reference. The rate at which packets are scheduled for despatch by a router is a function of the current value of the n-price.

The traffic flow is a function of a number of parameters, the dominant factors being provisioning potential and resource admittance/availability.

In a further embodiment, an edge router may reduce the need for signalling traffic by the use of prediction techniques to determine estimated data values.

An edge router may determine a lifetime for its stored link occupancy data, and acquire new data only at the expiry of that lifetime Advantageously, communication between the databases and the core and edge routers is effected via a common software bus.

BRIEF DESCRIPTION OF THE DRAWINGS

Embodiments of the invention will now be described to the accompanying drawings in which.

DESCRIPTION OF THE PREFERRED EMBODIMENTS

Figure 1:
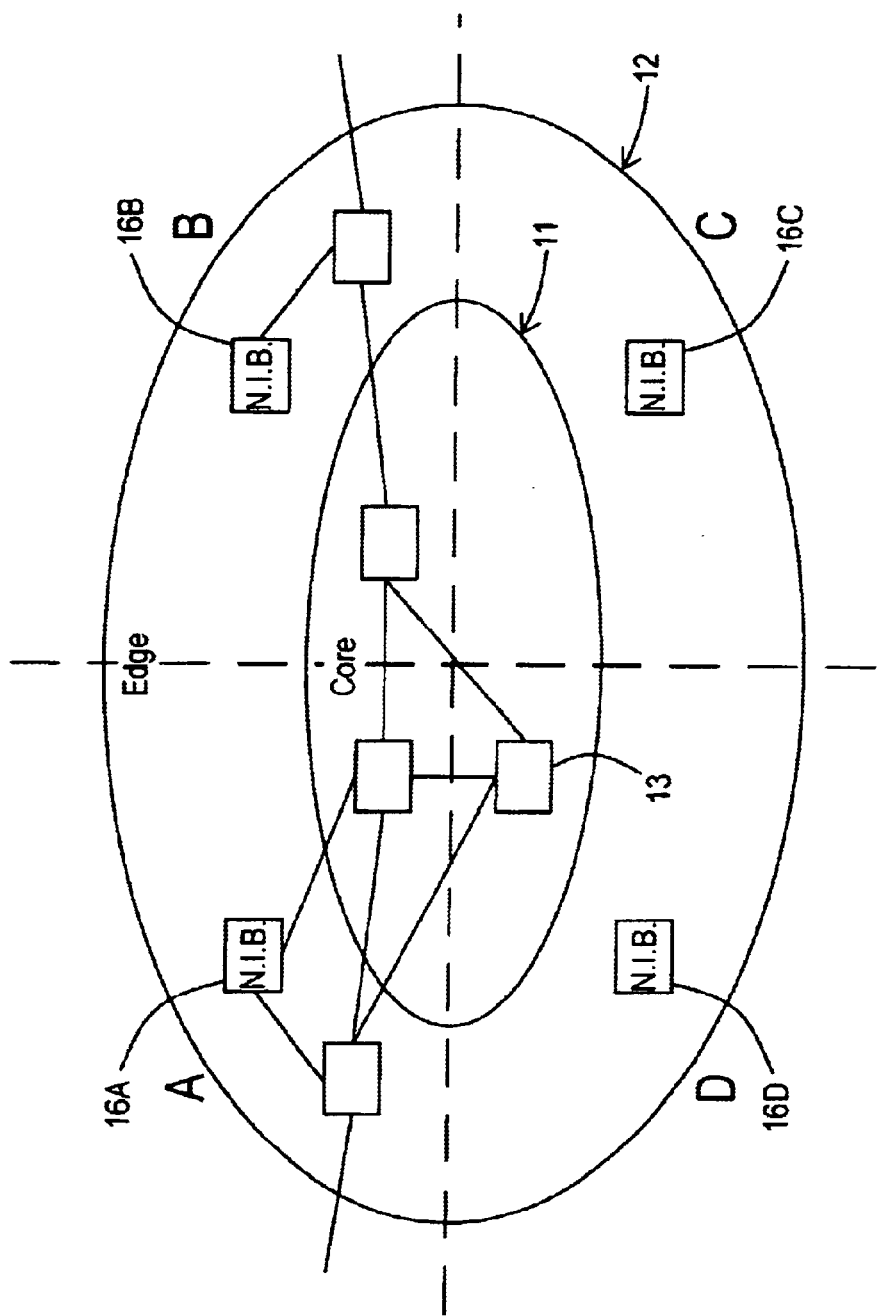
FIG. 1 is a schematic diagram of an IP network.

Referring first to FIG. 1, this shows an exemplary IP (Internet Protocol) network comprising a core network 11 and a network edge 12. Preferably the core network 11 is an optical network.

The core network is constituted by a plurality of nodes or routers 13 interconnected by links 14 e.g. optical fibre paths, so as to form a mesh. The core network 11 is accessed via edge routers 15 at the network edge 12. As shown in FIG. 1, the network is partitioned into regions (A,B,C and D). In FIG. 1, four regions are shown, but it will be appreciated that a practical network may contain a large number of regions. Each region is provided with a respective network information base (NIB), 16A to 16D, in which information relating to link occupancy in that region is stored. Advantageously, this link occupancy date is classified into the various quality of service (QoS) traffic claims that are handled by the network.

In the network of FIG. 1, packets arriving at an edge router 15 are queued prior to dispatch. The router determines for each queued packet a route for that packet base on routing tables stored in the router and on link occupancy information relevant to the selected route. This link occupancy information is obtained from the network information bases in those regions of the network through when the chosen route passes. This enables the edge router to control despatch of arriving packets into the network core such that the, traffic flows in the core network are maintained within the resource capacity of the core network. This avoids the need for queuing and buffering at routers within the core network.

Figure 2:
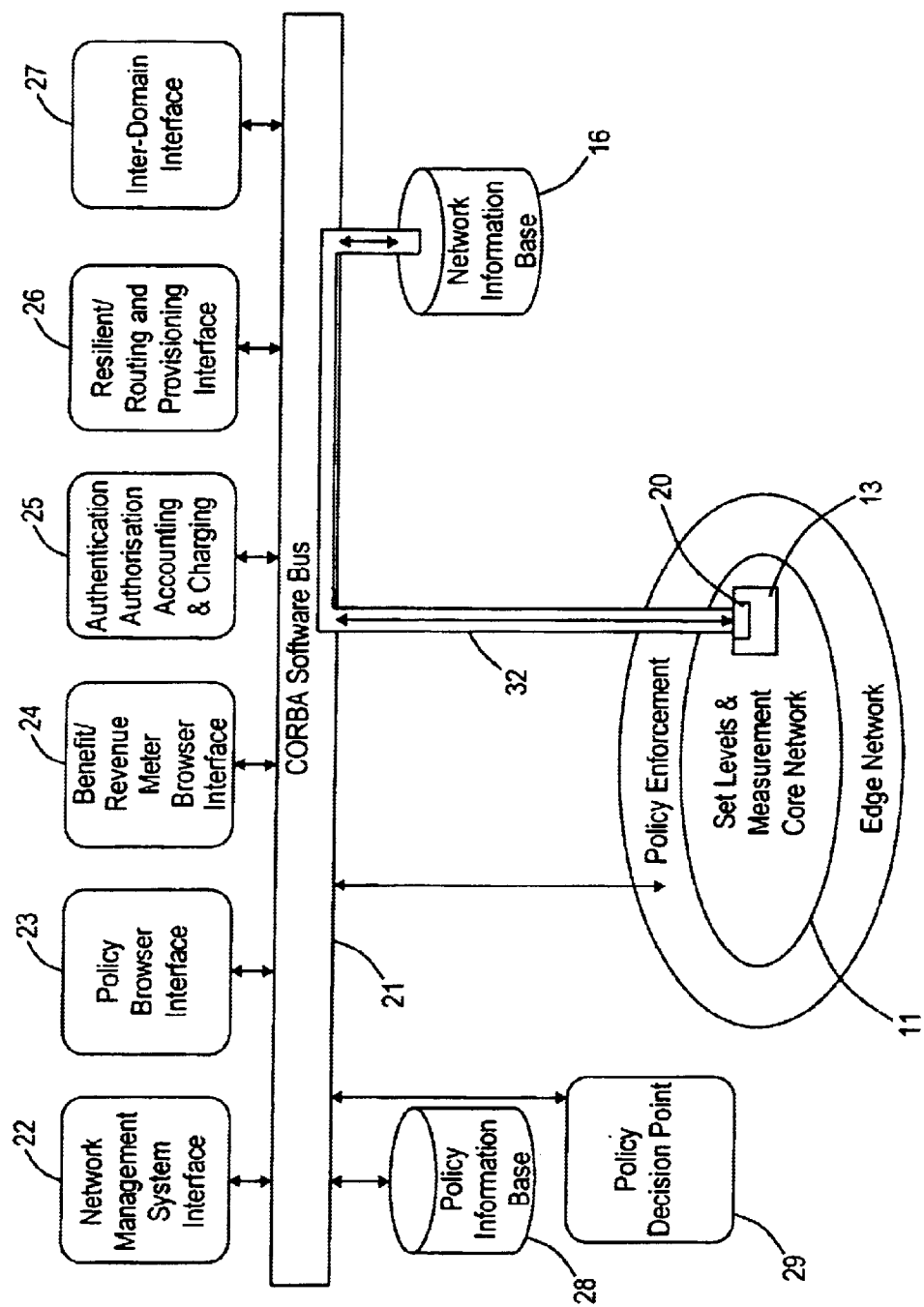
FIG. 2 is a schematic diagram of a management system for the network of FIG. 1.

FIG. 2 depicts an exemplary management or resource control system or middleware for use with the network of FIG. 1. As shown in FIG. 2, a CORBA software bus 21 provides a communications mechanism between the management system and the network. The software bus 21 is accessed by a number of interfaces including a network management system interface 22, a policy browser interface 23, a benefit/revenue meter browser interface 24, are authentication authorisation accounting and charging interface 25, a resilient/routing and provisioning interface 26 and an interdomain interface 27. The functionality of these interfaces will be familiar to those skilled in the art. Advantageously a policy information base 28 and a policy decision point are also coupled to a CORBA bus.

In the arrangement of FIG. 2, the CORBA bus also provides a communications medium between the software objects 20 running on the core routers 13 and the network information bases 16.

Within the network core 11, the distributed software objects 20 running on the core routers 13 log the local traffic data and store this information in the respective network information base 16 that has been assigned to that portion of the network. The CORBA software bus 21 provides an interface for a communications channel 32 between the software objects and the network information base.

This information that is gathered and stored in the network information base 16 typically comprises link occupancy data for the core network. Advantageously, this link occupancy data is classified according to quality of service (QoS) class of the traffic on a particular link.

An edger router wishing to despatch a packet, determines a route across the network for that packet to its destination. In order to control scheduling of the packet and allocation of resources to the packet transport, the router uses the network information that is acquired from the network information base in those network regions through which the route passes. This information may be acquired by polling a network information base ('pulling') or network information base may broadcast ('pushing') its information via the COBRA bus to the edge routers.

Advantageously, those network information bases that are disposed in busy parts of the network broadcast or push their information, while those network information bases in underused parts of the network are polled for their information. The edge routers use this acquired information to control their packet scheduling so that packets are launched into the optical core network only if resources are currently available for the processing of those packets.

Advantageously, the despatch of packet from a router is controlled by resource pricing or n-pricing as discussed above. In this technique, a network resource, typically bandwidth, is accorded a dynamic notional price that is a function of current usage. i.e. an increase in traffic results in a corresponding increase in resource price. In the exemplary network, this resource price is determined from the acquired link occupancy data. An edge router with queued packets awaiting despatch can thus determine, from the current resource price, the rate at which those packets may be scheduled for despatch. This rate is commensurate with the current resource availability within the core network. As the bandwidth availability reduces, the resource price is increased and the packet despatched route is reduced accordingly. Similarly, an increase in available bandwidth results in a decrease of the resource price and a corresponding increase in the despatch route.

In a modification of the technique, the edge routers predict, from previously acquired data, estimated data values during the intervals between the enquiry of new current data. This further reduces the volume of signalling traffic and also reduces the time required by the router to access and process information when scheduling packets for despatch. Also, an edge router can estimate the lifetime of information before it becomes 'stale' so that new information is acquired only when that lifetime has expired. This lifetime will be longer for network information bases situated in underused parts of the network.

Figure 3:
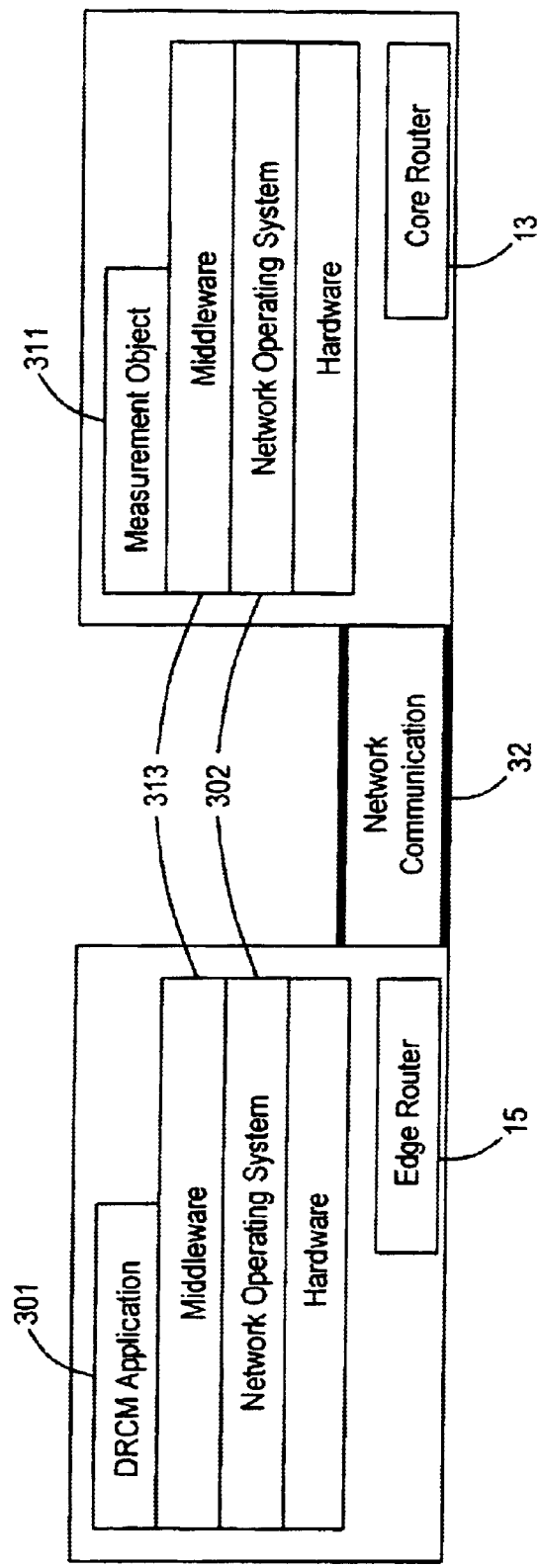
FIG. 3 illustrates a software management system architecture for use in the network of FIG. 1.

FIG. 3 illustrates in schematic form the architecture of the, measurement and control software. As illustrated in FIG. 3, an interface or mapping is provided between the DRCM application 301 running on the edge router 15 and the network operating system 302. Similarly, a software measurement object 311 running on the core router 13 is mapped to the network operating system 302 by middleware 313. Typically, the DRCM application 301 and the measurement object 311 are Java programmes. Network communication between the DRCM application and the measurement application is effected via the CORBA bus 21. The DRCM application 301 running at the ingress edge router 15 makes remote calls to the core routers via a network communication channel 32 carried on the CORBA software bus. In response to these calls, the metering or measurement objects 311 running at the core routers respond to the remote calls with the current traffic data. The operations software is provided in machine readable form on a storage medium.

The programme functionality is set out below:

Stage 1

The Java application running in the core router issues 'tc' commands e.g. every second to the Kernel 'tc-s qdisc' responds with the traffic statistic for the given nth device.

The response to 'tc' command is parsed to retrieve the data ('sent bytes' per class of traffic)

The response is compared with previous data.

Bit rate=data[previous]/(sample time*scale adjustment). This gives the bit rate per class of traffic at the given device.

The program once enabled, runs continuously. Prerequisite: Firstly, attach the desired queuing discipline (CBQ) to the device (eth$_x$) in the core router, Stage 2

Tb Java (DCRM) program at the edge router issues CORBA calls to the core router program (Stage 1) to fetch the bit rate information.

Stage 3

At the edge router, the data fetched in Stage 2 is stored in an appropriate database (NIB) and updated.

Stage 4

Convert the 'bit rate' response to 'resource price' information at the core router or at the edge router, according to the given formula Stage 5

The ingress controller now issues a 'resource price query' to the local database for a given source-destination pair, per traffic class.

The program uses the routing table, finds the participating core routers, finds matches in the 'resource price database' and responds with the total resource price.

Figure 4:
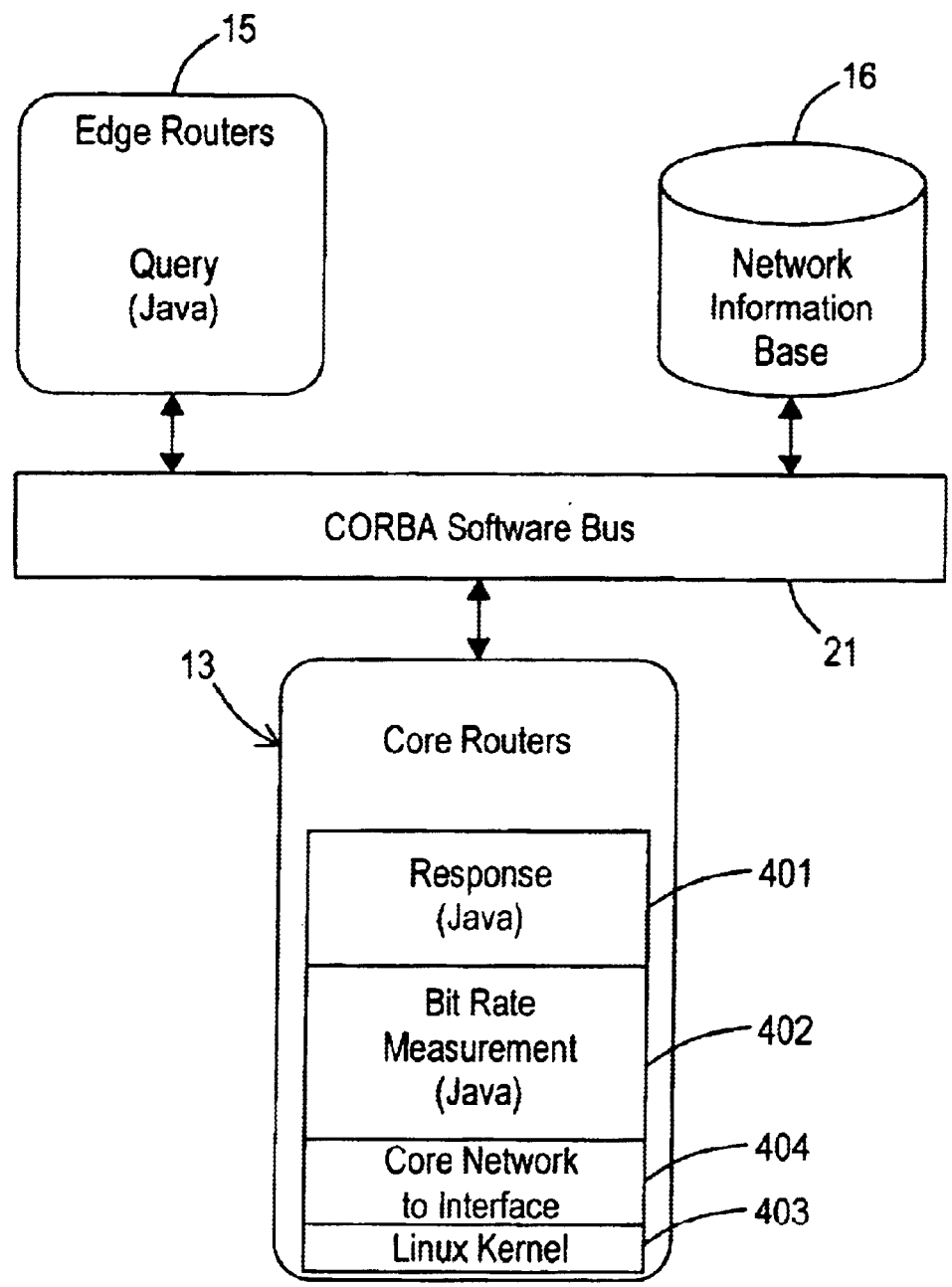
FIG. 4 shows part of the network management system of FIG. 3.

Referring now to FIG. 4, this figure illustrates the component blocks and the operation of the system.

As shown schematically in FIG. 4, the edge routers 15, the core routers 13 and the network information bases 16 can all communicate via the CORBA software bus 21. Within the core router 13, Java response 401 and bit rate measurement 402 interact with a Linux kernel 403 via a 'tc' interface 404.

Figure 5:
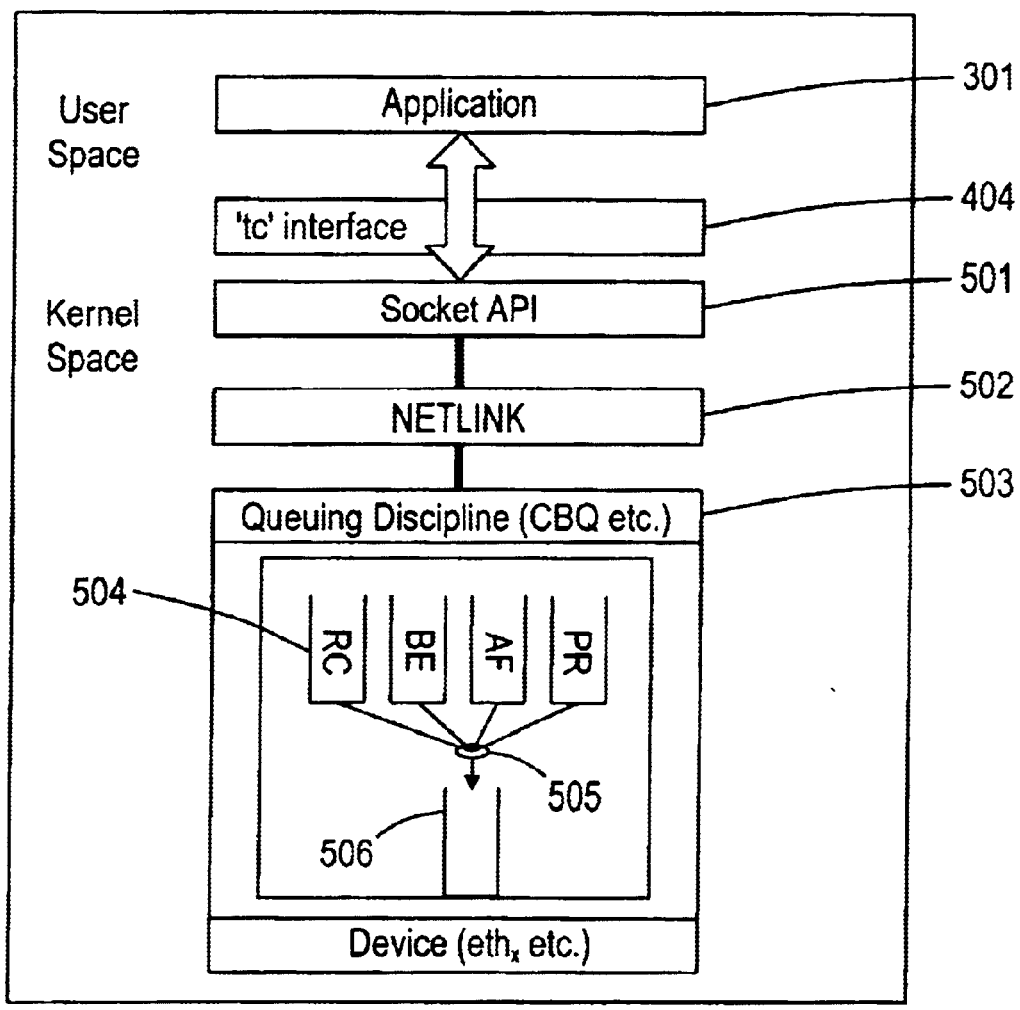
FIG. 5 illustrates the construction of a traffic control model for use in the network of FIG. 1.

A preferred structure of the Linux kernel for an edge router is shown in FIG. 5. The 'tc' interface 404 couples the application 301 via a socket API 501 and Netlink 502 to a queuing discipline arrangement 503. Within the queuing arrangement 503, traffic is arranged in queues 504 ready for despatch via scheduler 505 to appropriate output ports 506.

Figure 6:
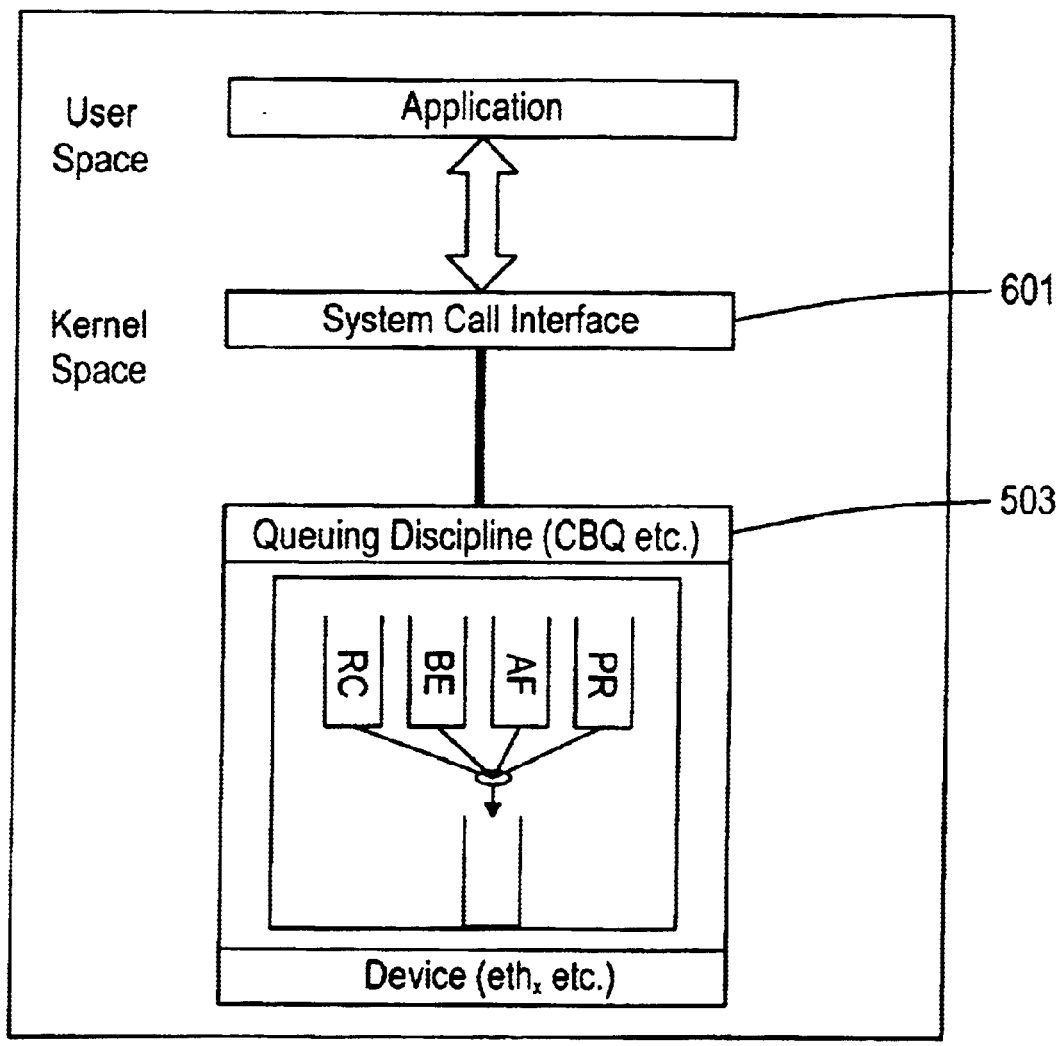
FIG. 6 shows a alternative traffic control model construction.

An alternative Linux kernel arrangement is shown in FIG. 6. In this arrangement, the application is coupled to the queuing arrangement 503 via a system call interface 601.

Figure 7:
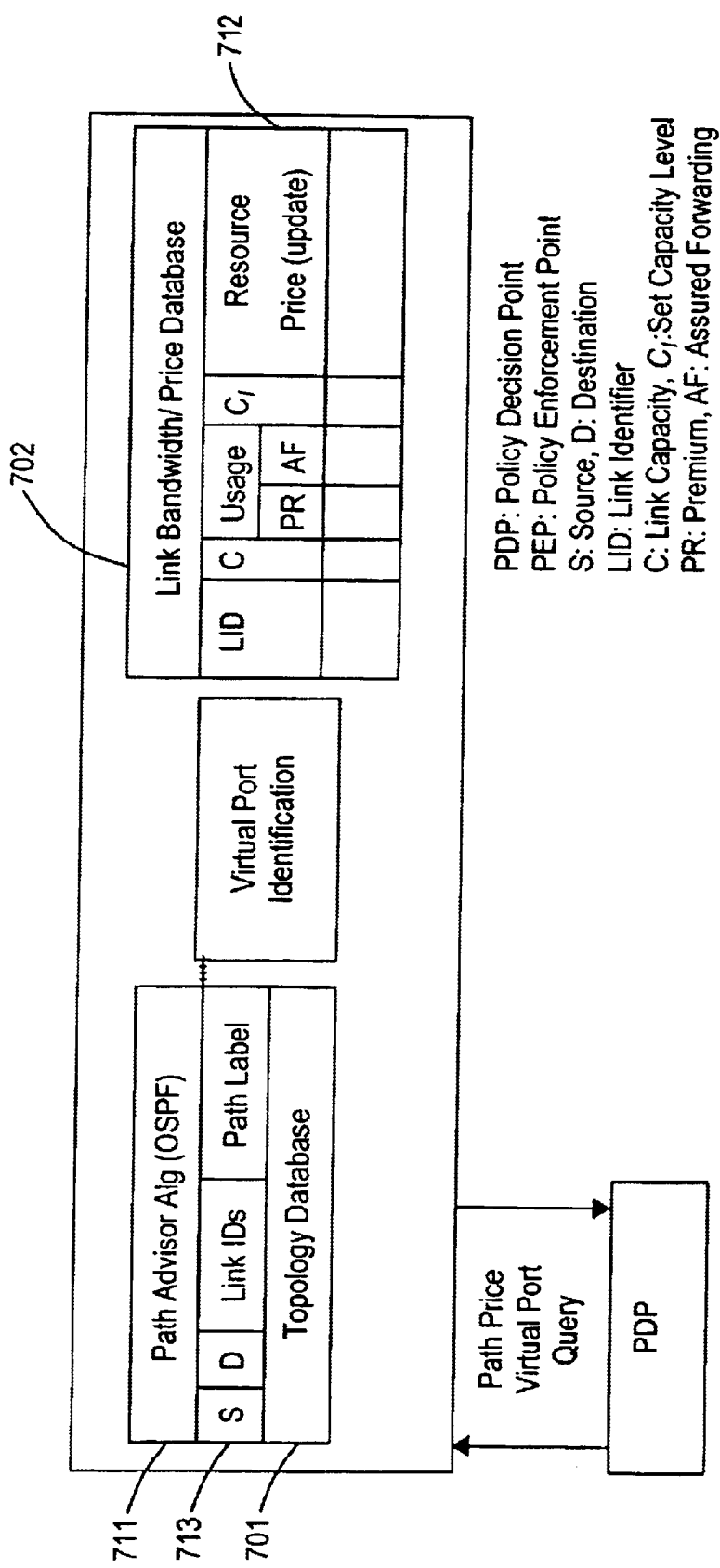
FIG. 7 shows the construction of a network information base (NIB) for use in the network of FIG. 1.

The general construction of the software architecture of a network information base is illustrated in FIG. 7. The arrangement incorporates topology database 701, and a link bandwidth/price database 702 containing a table 712 of acquired network information data for each link identifier (LID). The table contains data of capacity (C) premium (PR) and assured forwarding (AF) usage, the net capacity level (C) and a resource price, the latter being updated is the demand rises and falls. Typically, this resource price will comprise an n-price value as discussed above. The traffic flow is not necessarily determined solely by resource price, but can also be affected by provisioning potential and resource admittance.

The topology database 701 incorporates a path adviser algorithm 711 and incorporates a table 713 of link identifies and corresponding path links for sources (S) and destinations (D).

Figure 8:
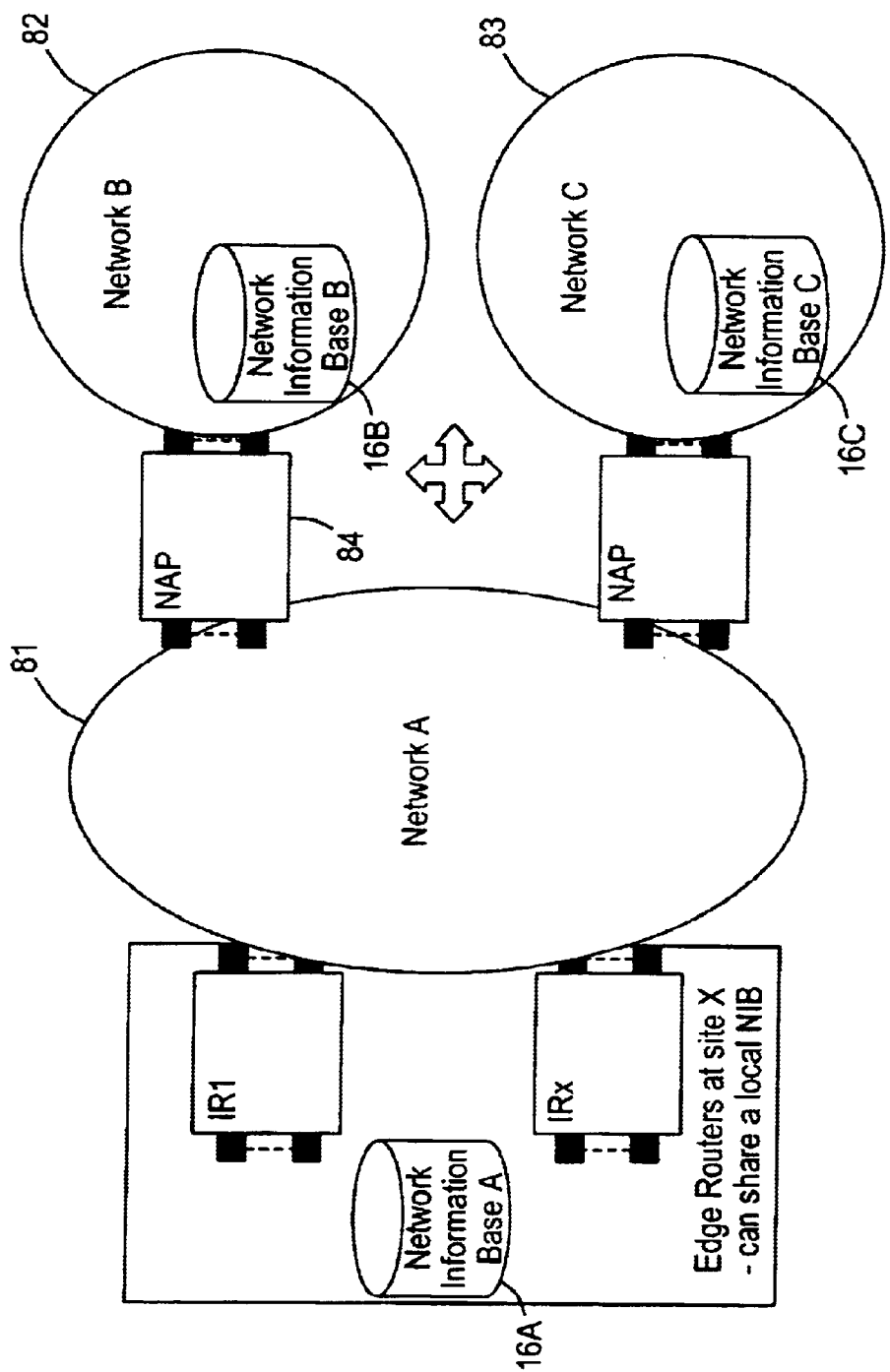
FIG. 8 illustrates a method of scaling the network of FIG. 1.

FIG. 8 illustrates the manner in which the technique described above may be scaled for operation over a plurality of networks. As shown in FIG. 8, a first network 81 is interface to a number of similar networks 82,83 via respective network access points 84. Each of the networks has respective network information bases 16A, 16B, 16C, and information acquired by these information bases is transformed between networks via the network access points. The arrangement thus operates as a single global network from the aspect of network information signalling.

Figure 9:
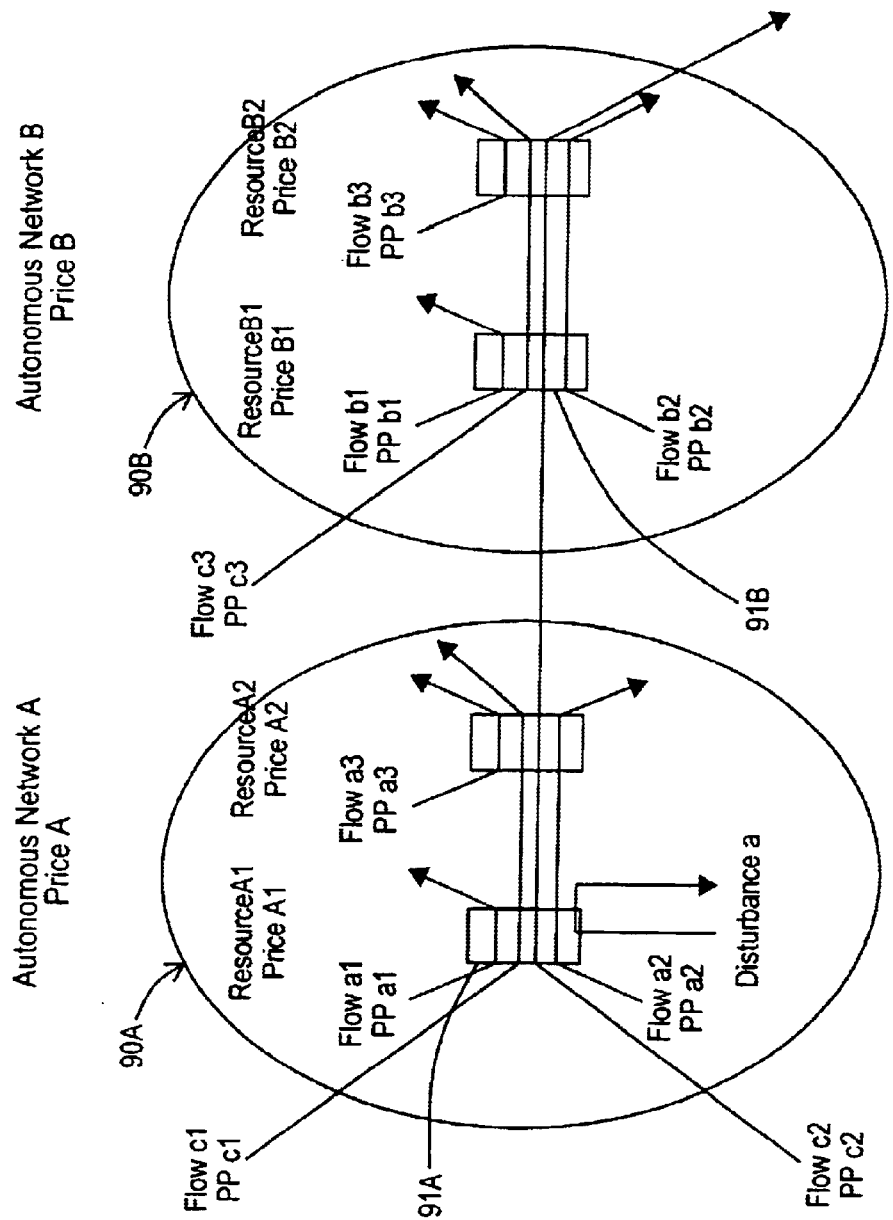
FIG. 9 depicts a model network arrangement demonstrating traffic flows in first and second autonomous network regions.
Figure 10A:
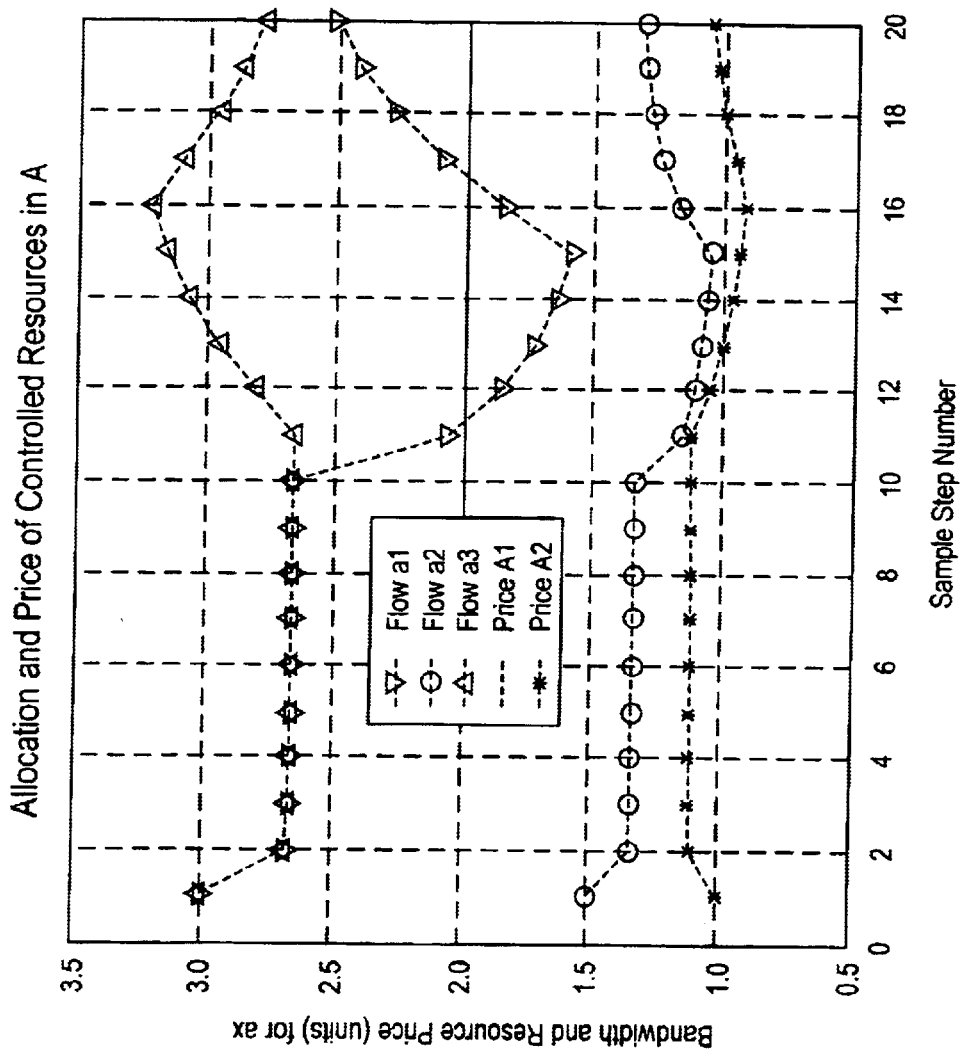
FIG. 10a illustrates simulated traffic flows in a first network region of the network arrangement of FIG. 9.
Figure 10B:
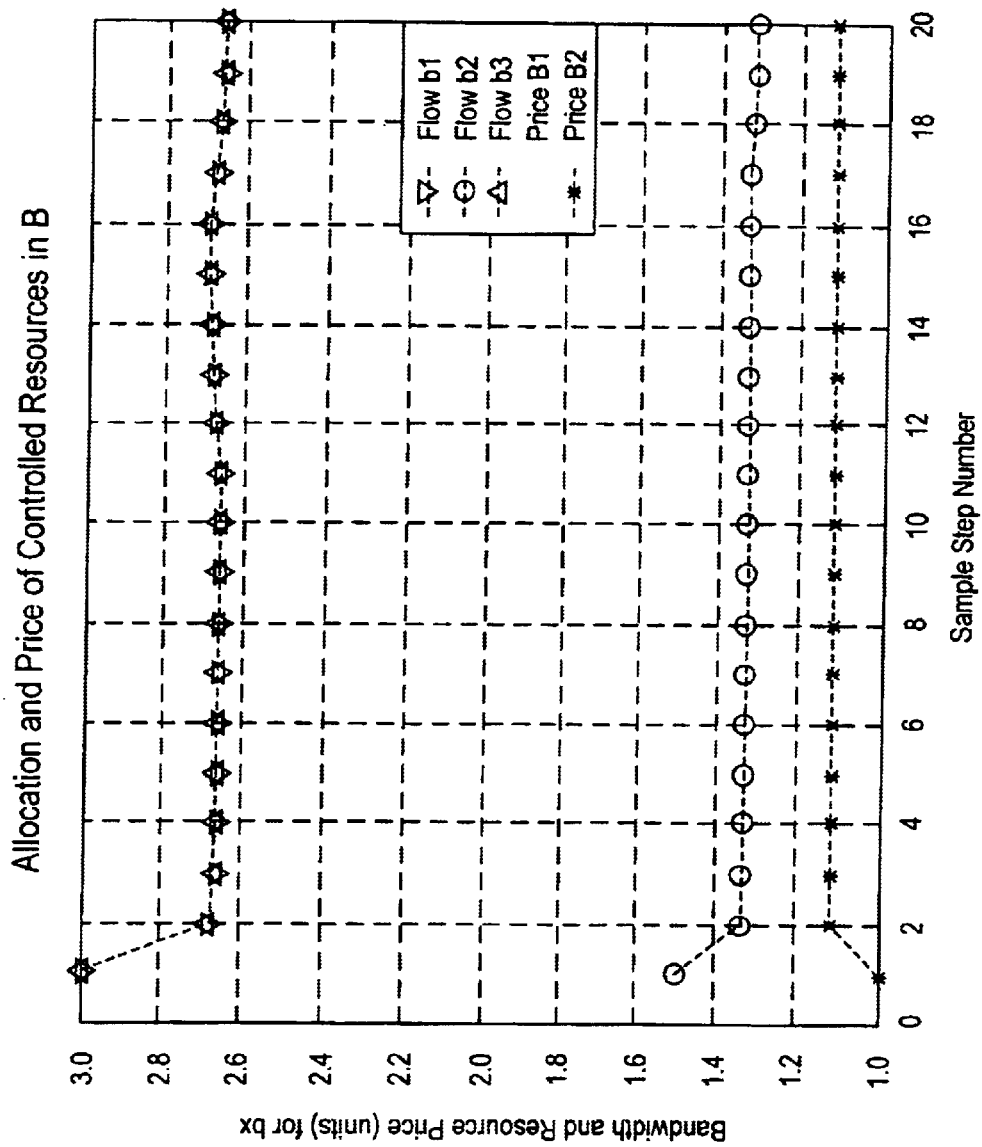
FIG. 10b illustrates simulated traffic flows in a second network region of the network arrangement of FIG. 9.
Figure 10C:
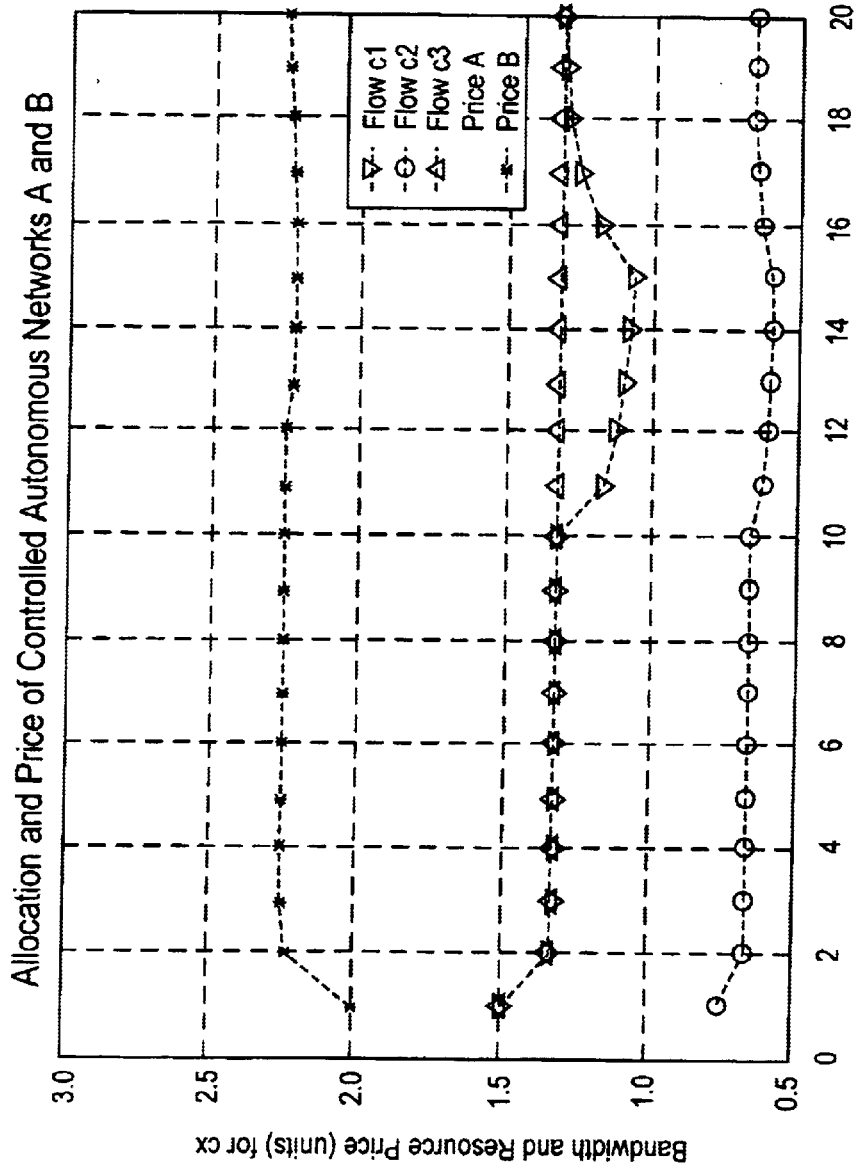
FIG. 10c illustrates aggregate traffic flows in a first and second network regions of a network arrangement of FIG. 9.

The operation of a composite network and as that of FIG. 8 is shown is FIG. 9 while represents a simulation of traffic flowing through core routers 91A, 92A and 91B, 92B in respective networks 90A and 90B. The accompanying graphs of FIGS. 10a to 10c illustrate the effect of a disturbance a resulting from an increase in traffic at the core router 91A of the network 90A. FIGS. 10a to 10c are graphs illustrating the relationship between resource price and resource allocation for the networks 90A, 90B and the combination of 90A and 90B respectively. The router 91A handles flows a1, a2, c1 and c2, the latter flow being directed, e.g. via a further core router, to the router 91B in network 90B. As can be seen from FIGS. 10a to 10c, a significant change in flow in the network 90A has a similar but relatively minor effect on the operation of the combination of the two networks 90A and 90B thus demonstrating the feasibility of the technique. In the network arrangement, the flows c1, c2 and c3c are controlled via the resource price information available at network access points. This eliminates the need to poll individual routers within an autonomous network. The system characteristics remain substantially the same across multiple domains.

It will of course be understood that although the method and apparatus have been described above with particular reference to the Internet protocol, the technique is in no way limited to this protocol but is of more general application to packet networks.

It will also be understood that the above description of a preferred embodiment is given by way of example only and that various modifications may be made by those skilled in the art without departing from the spirit and scope of the invention.

What is claimed is:

1. A method of scheduling despatch of information packets at an edge router in a communications packet network in a network comprising a core network of core routers interconnected by links and a plurality of edge routers providing access to the core network, said network being partitioned into a plurality of regions, each said region being provided with a respective network database, the method comprising; determining within each link occupancy data and storing that data in the respective network information database, and, at an edge router, acquiring said link occupancy data from the network information databases in those network regions through which packets are top be routed so as to schedule despatch of those packets at a rate commensurate with resource availability within the core network.

2. A method as claimed in claim 1, wherein traffic is allocated to a plurality of quality of service classes, and wherein said link occupancy data is classified according to quality of service class.

3. A method as claimed in claim 2, wherein said edge router acquires the link occupancy data by polling said network information databases.

4. A method as claimed in claim 3, wherein said polling is performed at intervals and wherein the edge router predicts said link occupancy data in the intervals between poling.

5. A method as claimed in claim 4, wherein communication between routers and the network information databases is effected via a common software bus.

6. A method as claimed in claim 5, wherein said link occupancy data is determined by software measurement objects running on said core routers.

7. A method as claimed in claim 6, wherein a notional resource price is determined from said link occupancy data.

8. A method as claimed in claim 7, wherein said resource price determines the rate at which packets are scheduled for despatch from a said edge router.

9. A method as claimed in claim 7, wherein an edge router determines a lifetime for its stored link occupancy data, and acquires new data at the expiry of that lifetime.

10. A method as claimed in claim 9, wherein said network is an internet protocol (IP) network.

11. Software stored on a storage medium in machine readable form for scheduling despatch of information packets at an edge router in a communications packet network in a network comprising a core network of core routers interconnected by links and a plurality of edge routers providing access to the core network, said network being partitioned into a plurality of regions, each said region being provided with a respective network information database, wherein the software is arranged to perform the method steps of; determining within each region link occupancy data and storing that data in respective network information database, and, at an edge router, acquiring said link occupancy data from the network information databases in those network regions through which packets are to be routed so as to schedule despatch of those packets at a rate commensurate with resource availability within the core network.

12. A communications packet network comprising a core network of core routers interconnected by links and a plurality of edge routers providing access to the core network, said network being partitioned into a plurality of regions, each said region being provided with a respective network information database, wherein the network incorporates means for determining, within each region, link occupancy data and for storing that data in the respective network information database, and wherein each said edge router has means for acquiring said link occupancy data from the network information databases in those network regions through which packets are to be routed so as to schedule despatch of those packets into the core network at a rate commensurate with resource availability within the core network.

13. A packet network as claimed in claim 12, wherein traffic is allocated to a plurality of quality of service classes, and wherein said link occupancy data is classified according to quality of service class.

14. A packet network as claimed in claim 13, wherein each said edge router is arranged to acquire the link occupancy data by polling said network information databases.

15. A packet network as claimed in claim 14, wherein said polling is performed at intervals and wherein the edge router predicts said link occupancy data in the intervals between polling.

16. A packet network as claimed in claim 15, wherein an edge router determines a lifetime for its stored link occupancy data, and acquires new data at the expiry of that lifetime.

17. A packet network as claimed in claim 16, wherein communication between routers and the network information databases is effective via a common software bus.

18. A packet network as claimed in claim 17, wherein said link occupancy data is determined by software measurement objects running on said core routers.

19. A packet network as claimed in claim 18, wherein a notional resource price is determined from said link occupancy data.

20. A packet network as claimed in claim 19, wherein each said edge router determines from said resource price the rate at which packets are despatched into the core network.

21. An edge router for providing access to a communications packet network comprising a core network of core routers interconnected by links, said network being partitioned into a plurality of regions, each said region being provided with a respective network information database containing link occupancy data, and wherein each said edge router has means for acquiring said link occupancy data from the network information databases in those network regions through which packets are to be routed so as to schedule despatch of those packets into the core network at a rate commensurate with resource availability within the core network.

22. An edge router as claimed in claim 21, and including means for determining from a dynamic notional resource price rate at which packets are despatched, said rates being commensurate with resource availability.

23. An edge router as claimed in claim 22, wherein each said edge router is arranged to acquire the link occupancy data by polling said network information databases.

24. An edge router as claimed in claim 23, wherein said polling is performed at intervals and wherein the edge router has means for predicting said link occupancy data in the intervals between polling.

25. An edge router as claimed in claim 24, and arranged to determine a lifetime for its stored link occupancy data, and to acquire new data at the expiry of that lifetime.

* * * * *